United States Patent [19]

Ihara et al.

[11] Patent Number: 4,614,276

[45] Date of Patent: Sep. 30, 1986

[54] LAMINATED RUBBER STOPPER

[75] Inventors: Kiyohiko Ihara, Suita; Tsuneo Nakagawa, Ibaraki, both of Japan

[73] Assignees: Daikin Industries, Osaka; Kabushiki Kaisha Daikyo Gomu Suki, Tokyo, both of Japan

[21] Appl. No.: 736,312

[22] Filed: May 21, 1985

[30] Foreign Application Priority Data

May 22, 1984 [JP] Japan ................................. 59-104044
Mar. 26, 1985 [JP] Japan ................................. 60-062826

[51] Int. Cl.$^4$ ............................................. B65D 39/00
[52] U.S. Cl. .................................................. 215/364
[58] Field of Search ................................. 215/364, 247

[56] References Cited

U.S. PATENT DOCUMENTS 3,760,969  9/1973  Shimamoto et al. ............ 215/364 X
4,554,125  11/1985  Knapp ............................ 215/364 X Primary Examiner—Donald F. Norton
Attorney, Agent, or Firm—Birch, Stewart, Kolasch & Birch

[57] ABSTRACT

A laminated rubber stopper comprising a head portion and a leg portion which is to be inserted in an opening of a vessel, wherein at least a leg portion is laminated with a film of a copolymer of tetrafluoroethylene, ethylene and at least one fluorine-containing vinyl monomer copolymerizable with tetrafluoroethylene and ethylene, a molar ratio of tetrafluoroethylene and ethylene being from 62:38 to 90:10 and the amount of the fluorine-containing vinyl monomer being from 0.1 to 10% by mole based on the total number of mole of tetrafluoroethylene and ethylene, which has improved fitting with an opening of a vessel and sealing properties and can be produced with low failure rate.

4 Claims, 4 Drawing Figures

LAMINATED RUBBER STOPPER

FIELD OF THE INVENTION

The present invention relates to a laminated rubber stopper. More particularly, it relates to a rubber stopper at least a leg portion of which is laminated with a specific fluorine-containing resin film having improved chemical resistance, sealing properties, non-adsorbability and flexibility, and suitable as a stopper of a vessel in which a medicament is stored for a long time with reserving its initial purity.

BACKGROUND OF THE INVENTION

A vessel for storing a medicament has been made of glass and is recently made of plastics. An opening of the vessel is sealed with a stopper made of a material which has good resistance against heat and compressive strain, flexibility and is chemically inactive and non-permeable to gasses such as oxygen, nitrogen, carbon dioxide and water vapor.

As the stopper material, G. K. Merinikowa proposed an elastic copolymer of isoprene and isobutylene (hereinafter referred to as "IIR"). Further, to improve the properties of the stopper, there are proposed several manners such as compounding of polyethylene fine powder in a rubber, co-crosslinking of chlorinated butyl rubber and nitrile rubber, use of a styrene-butadiene-styrene block copolymer, a coating of a silicone type compound or a fluorine-containing compound on the molded rubber stopper and laminating of the stopper with a film of polypropylene, polyethylene, polyamide and fluororesin (cf. Japanese Utility Model Publication Nos. 27753/1969, 17831/1970, 21346/1974 and 28207/1979 and Japanese Patent Publication Nos. 1355/1977, 9119/1979 and 53184/1982).

Although the silicone type compound and the fluorine-containing compound reduce the adhesivity of the surface of the stopper, they cannot completely be coated on the surface of the stopper so that the coated stopper has, as the stopper of the vessel for the medicaments, poor chemical and physical properties, particularly, the number of fine particles.

On the contrary, the laminated rubber stopper has better chemical and physical properties. However, precise investigation of the laminated stopper revealed that the fluororesins such as polytetrafluoroethylene have unsatisfactory moldability and/or mechanical strength, require many steps to laminate it on the stopper and have poor adhesivity on the rubber surface.

To overcome such drawbacks of the laminated stopper, it is proposed to use a fluorine-containing copolymer as a laminating material and to laminate it simultaneously with vulcanization of the stopper rubber (cf. Japanese Patent Kokai Publication (unexamined) No. 5046/1984). This method is superior as a method for producing a rubber stopper. As the preferred fluorine-containing copolymer, exemplified are tetrafluoroethylene/ethylene alternating copolymers and tetrafluoroethyolene/hexafluoropropylene copolymers. Although the conventional tetrafluoroethylene/ethylene alternating copolymer has comparatively large tensile strength and elongation at a vulcanizing temperature and satisfactory processability during laminating the stopper, failure rate of the resin film in the production of the laminated rubber stopper is still unsatisfactory. In addition, since elasticity and compressive strain resistance of the rubber are deteriorated due to hardness of the resin film, the produced laminated stopper has poor fitting with the opening of the vessel, which may result in some troubles such as air leak in formulation of a medical preparation under reduced pressure. Further, the fluororesin film has unsatisfactory sealing property. The tetrafluoroethylene/hexafluoropropylene copolymer has poorer laminating moldability and adhesivity with the rubber since it has worse mechanical properties at or about a molding temperature than the tetrafluoroethylene/ethylene copolymer.

Standards to be satisfied by a stopper of a vessel for medicaments are defined by, for example, Japanese Pharmacopoeia, 10th Edit., British Standards 3263 (1960) and DIN. However, these standards are not suitable for prolonged storage of medicaments having high quality. Further, since methods for formulating medicaments are greatly improved, the stopper plays a more important role in the pharmaceutical field.

The properties to be satisfied by the stopper are roughly classified into chemical ones and physical ones. An example of the material having excellent chemical properties is a fluororesin. However, as described above, it does not necessarily satisfy all the physical properties such as flexibility, moldability and adhesivity.

SUMMARY OF THE INVENTION

One object of the present invention is to provide a laminated rubber stopper which does not suffer from the drawbacks of the above described conventional rubber stopper.

Another object of the present invention is to provide a laminated rubber stopper having improved fitting with an opening of a vessel and sealing properties.

Further object of the present invention is to provide a laminated rubber stopper which can be produced with low failure rate.

Accordingly, the present invention provides a laminated rubber stopper comprising a head portion and a leg portion which is to be inserted in an opening of a vessel, wherein at least the leg portion is laminated with a film of a copolymer of tetrafluoroethylene, ethylene and at least one fluorine-containing vinyl monomer copolymerizable with tetrafluoroethylene and ethylene, a molar ratio of tetrafluoroethylene and ethylene being from 62:38 to 90:10 and the amount of the fluorine-containing vinyl monomer being from 0.1 to 10% by mole based on the total number of mole of tetrafluoroethylene and ethylene.

DETAILED DESCRIPTION OF THE INVENTION

Figure 1:
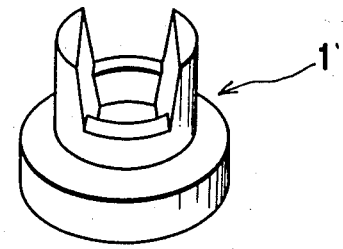
FIG. 1 is a perspective view of one embodiment of the laminated rubber stopper of the invention.

The conventionally used tetrafluoroethylene/ethylene copolymer is an alternating copolymer and the molar ratio of tetrafluoroethylene and ethylene is from 40:60 to 60:40 and practically about 50:50. On the contrary, the copolymer of the present invention contains tetrafluoroethylene in a larger amount, which results in better flexibility than the conventional tetrafluoroethylene/ethylene alternating copolymer. The fluorine-containing vinyl monomer may be any one that is copolymerizable with tetrafluoroethylene and ethylene and preferably provides the copolymer with the side chain having at least one carbon atom. In view of productivity such as polymerizability and the cost, examples of the preferred monomers are vinyl monomers of the formulas:

$$CH_2=CFR_f$$

and $$CH_2=CHR_f$$

wherein $R_f$ is fluoroalkyl having 1 to 10 carbon atoms. Specific examples of the fluorine-containing monomer are $CH_2=CFC_3F_6H$, $CH_2=CFC_5F_{10}H$, $CH_2=CHC_4F_9$, $CH_2=CHC_6F_{13}$, etc.

The amount of the fluorine-containing vinyl monomer is from 0.1 to 10% by mole, preferably from 0.5 to 5% by mole based on the total number of mole of tetrafluoroethylene and ethylene. A mixture of two or more fluorine-containing monomers may be used.

The copolymer with the above composition is excellent in chemical and physical properties, and has satisfactory flexibility, processability and adhesivity with the rubber.

The copolymer to be used according to the present invention may be prepared by a process described copending U.S. Patent Application Ser. No. 736,314 or European Patent Application No. 85106283.6 (filed on the same day as this application. Title of the invention: ETHYLENE/TETRAFLUOROETHYLENE COPOLYMER), the disclosure of which is herein incorporated by reference. For example, the copolymer may be prepared by suspension, emulsion, solution, bulk or gaseous phase copolymerization. Commercially, the suspension polymerization is preferably employed, in which the reaction is carried out in an aqueous medium containing chlorofluoroalkane as a solvent by using an organic peroxide as a polymerization initiator. Specific examples of chlorofluoroalkane are trichlorotrifluoroethane, dichlorotetrafluoroethane, dichlorodifluoromethane, chlorodifluoromethane, dichlorofluoromethane, etc. The amount of the solvent to be added to water is preferably from 10 to 100% by weight.

Preferred organic peroxide initiator is a peroxide of the formula:

$$(YC_mF_{2m}COO)_2 \quad (I)$$

wherein Y is hydrogen, fluorine or chlorine, and m is an integer of 2 to 8. Examples of the peroxide (I) are diperfluoropropyonylperoxide, di(omega-hydroperfluorohexanoyl)peroxide, di(omega-chloroperfluoropropyonyl)peroxide, etc.

A peroxide of the formula:

$$[Cl(CF_2CFCl)_lCF_2COO]_2 \quad (II)$$

wherein l is an integer of 1 to 10 (e.g. di(trichloroperfluorohxanoyl)peroxide) and hydrocarbon type peroxides (e.g. diisobutylperoxide, diisopropylperoxydicarbonate, etc.) are also preferred.

The reaction temperature is not critical in the preparation of the copolymer used in the present invention. It is preferably from 0° to 100° C. It is preferred to keep the temperature as low as possible in said temperature range so as to prevent the formation of ethylene-ethylene sequence.

The reaction pressure depends on the reaction temperature and the kind, amount and vapor pressure of the solvent in which the monomers are dissolved. Preferably, it is from 0 to 50 Kg/cm²G, practically from 1 to 15 Kg/cm²G.

In order to control the molecular weight of the copolymer, a chain transfer agent may be added to the polymerization system. Specific examples of the chain transfer agent are isopentane, n-hexane, cyclohexane, methanol, ethanol, carbon tetrachloride, chloroform, methylene chloride, methyl chloride, etc.

The copolymer film to be laminated on the rubber stopper may be produced by a per se conventional method. For example, the copolymer is processed in the form of a film by a T die method at a temperature of 260° to 360° C. by means of a conventional film extruder. Optionally, the produced film is re-stretched to form a film having uniform thickness of 0.002 to 0.5 mm.

In order to improve the adhesivity of the film with the rubber, the film surface may be treated with electrical discharge, for example, corona discharge or gas plasma.

The laminated rubber stopper may be of any shape, and the copolymer film can be laminated on the rubber stopper having a very complicated shape simultaneously with the vulcanization of the rubber material.

Figure 2:
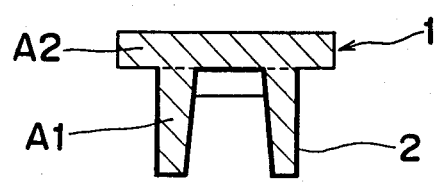
FIG. 2 is a cross section of the laminated rubber stopper of FIG. 1., in which only the leg portion is laminated.

In case of a laminated rubber stopper the perspective view and cross section of which are shown in FIGS. 1 and 2, respectively, the whole film is stretched by a factor of four on the average, and a particular portion of the film is stretched by a factor of about 7 to 8 at the vulcanizing temperature. If the film cannot stand this stretching condition, it is broken during the vulcanization step and the produced laminated stopper is condemned. The failure rate in the production of the laminated rubber stopper is, however, greatly reduced according to the present invention since the copolymer film to be laminated has the above composition so that it has good tensile strength and elongation at a high temperature.

The body of the stopper may be made of any conventional rubber material. For example, the rubber material is IIR, isoprene rubber (IR), butadiene rubber (BR), styrene-butadiene rubber (SBR), ethylene-propylene rubber (EPM), ethylene-propylene-diene rubber (EPDM), chlorosulphonated polyethylene (CSM), ethylene-vinyl acetate copolymer (EVA), styrene-isoprene rubber (SIR), thermoplastic elastomers and natural rubbers. To the rubber material, suitable additives such as a vulcanizing agent, a vulcanizing accelerator, a vulcanizing activator, a processing aid, a filler, a reinforcing agent, etc. may be added to maintain and improve the physical properties and heat resistance of the rubber material.

The present invention will be hereinafter explained further in detail by following Examples, in which the characteristics of the obtained copolymer are measured and/or calculated as follows:

Monomeric Composition of Copolymer

The content of the fluorine-containing vinyl monomer is calculated by dividing the difference between the charged amount and the recovered amount by the weight of the obtained copolymer. The content of ethylene and tetrafluoroethylene are calculated from the content of the fluorine-containing vinyl monomer and the results of elementary analysis.

Flow rate a Koka-type flow tester is used. A copolymer is extruded from an orifice of 2 mm in inner diameter and 8 mm in land length at 300° C. under piston load of 7 Kg/cm$_2$. An amount (ml) extruded in one second is recorded.

Melting Point

A Perkin-Elmer II-type differential scanning calorimeter is used. A melting peak is recorded by raising a temperature at a rate of 20° C./min. and the temperature corresponding to the maximum value is assigned to the melting point of the copolymer.

Preparation Example

In a 4 l glass-lined autoclave, deoxygenated water (1.2 l) was charged and the interior was evacuated to a reduced pressure. Then, dichlorotetrafluoroethane (1 Kg) was charged and kept at 15° C. followed by the addition of $CH_2=CFC_3F_6H$ (3.5 g) and cyclohexane (1.5 ml). Thereafter, a gaseous mixture of tetrafluoroethylene and ethylene in a molar ratio of 97.4:2.6 was injected with stirring to pressurize to 6 Kg/cm$^2$G. The reaction was initiated by the addition of di(omega-hydroperfluorohexanoyl)peroxide (2.1 g). As the reaction proceeded, the pressure dropped. Then, a mixture of tetrafluoroethylene, ethylene and $CH_2=CFC_3F_6H$ in a molar ratio of 63.3:34.0:2.7 was injected to keep the pressure constant at 6 Kg/cm$^2$G. After continuing the reaction for 27.7 hours with the addition of the same peroxide (each 0.6 g) every 2 hours at twice, the reaction mixture was recovered to obtain the white powdery copolymer (311 g). Monomeric composition, tetrafluoroethylene:ethylene:$CH_2=CFC_3F_6H$=63.3:34.0:2.7 [tetrafluoroethylene/ethylene=65.1:34.9, $CH_2=CFC_3F_6H$=2.7% by mole]. M.P., 225° C. Flow rate, 0.45×10$^{-2}$ ml/sec.

Comparative Preparation Example

In a 3 l glass-lined autoclave, deoxygenated water (1.2 l) was charged and the interior was evacuated to a reduced pressure. Then, dichlorotetrafluoroethane (1 Kg) was charged and kept at 15° C. followed by the addition of $CH_2=CFC_3F_6H$ (9.5 g) and n-pentane (25 ml). Thereafter, a gaseous mixture of tetrafluoroethylene and ethylene in a molar ratio of 83.2:16.8 was injected to pressurize to 6 Kg/cm$^2$G. The reaction was initiated by the addition of di(omega-hydroperfluorohexanoyl)peroxide (1.93 g). As the reaction proceeded, the pressure dropped. Then, a mixture of tetrafluoroethylene, ethylene and $CH_2=CFC_3F_6H$ in a molar ratio of 52.0:45.9:2.1 was injected to keep the pressure constant at 6 Kg/cm$^2$G. After continuing the reaction for 5.5 hours with the addition of the same peroxide (each 1.16 g) every 2 hours, the reaction mixture was recovered to obtain the powdery copolymer (89.8 g). Monomeric composition, tetrafluoroethylene:ethylene:$CH_2=CFC_3F_6H$=52.0: 45.9:2.1 [tetrafluoroethylene/ethylene=53.1:46.9, $CH_2=CFC_3F_6H$=2.1% by mole]. M.P., 268.5° C. Flow rate, 0.74×10$^{-2}$ ml/sec.

The monomeric compositions and physical properties of the copolymers produced in Preparation Example and Comparative Preparation Example are summarized in Table 1.

The physical properties of the copolymers are measured as follows:

Tensile Strength

A copolymer having thickness of 100 micrometers formed in a JIS (Japanese Industrial Standards) No. 3 dumbbell is stretched at 25° or 180° C. at a stretching rate of of 200 mm/sec. to tensile strength and elongation at break.

Flexural Modulus

According to ASTM D 747, flexural modulus of a copolymer film or 1 mm in thickness is measured at 25° C.

Durometer Hardness

According to ASTM D 2340, durometer hardness of a copolymer film of 2 mm in thickness is measured at 25° C.

TABLE 1

|  | Preparation Example | Comparative Preparation Example |
|---|---|---|
| Monomeric composition |  |  |
| Tetrafluoroethylene | 65.1 | 53.1 |
| Ethylene Molar ratio | 34.9 | 46.9 |
| $CH_2=CF_3F_6H$ (mole %) | 2.7 | 2.1 |
| Melting point (°C.) | 225 | 268.5 |
| Tensile strength |  |  |
| At 25° C. |  |  |
| Elongation at break (%) | 570 | 530 |
| Tensile Strength at break (Kg/cm$^2$) | 412 | 544 |
| At 180° C. |  |  |
| Elongation at break (%) | 820 | 710 |
| Tensile Strength at break (Kg/cm$^2$) | 114 | 86 |
| Durometer hardness | D56 | D68 |
| Flexural modulus (× 10$^3$ Kg/cm$^2$) | 6.2 | 14.0 |

From the results in Table 1, it is understood that the copolymer producedin Preparation Example has improved tensile strength and elongation at break and better flexibility in comparison with the copolymer produced in Comparative Preparation Example at a high temperature.

To show the superiority of the monomeric composition according to the present invention, relationship between the molar ratio of tetrafluoroethylene and ethylene and hardness as well as flexural modulus is shown in Table 2.

TABLE 2

| Composition | | | Flexural |
|---|---|---|---|
| Tetrafluoro-ethylene/Ethylene (Molar ratio) | $CH_2=CFC_3F_6H$ (Mole %) | Durometer hardness (D type) | modulus (10$^3$ Kg/cm$^2$) |
| 53.1:46.9 | 2.1 | 68 | 14.0 |
| 58.7:41.3 | 3.0 | 65 | 12.3 |
| 65.1:34.9 | 2.7 | 56 | 6.2 |
| 75.0:25.0 | 2.4 | 57 | 7.0 |

Before laminating the film on the rubber stopper, the surface of the film used was spatter etched under pressure of 1×10$^{-2}$ Torr at Rf voltage of 800 W at a windup rate of 0.3 m/min.

EXAMPLES 1-2 AND COMPARATIVE EXAMPLES 1-3

In Examples, following rubber compound was used:

| Component | Parts by weight |
| --- | --- |
| IIR (JSR Butyl 365) | 100 |
| Zinc white | 3 |
| Stearic acid | 1 |
| Clay | 60 |
| Processing aid | 1.2 |
| Magnesium oxide | 5 |
| White carbon | 10 |
| Titanium oxide | 3 |
| Surfur | 0.7 |
| Zinc di-n-butyldithiocarbamate | 0.7 |
| Zinc diethylithiocarbamate | 0.5 |

The rubber stopper was produced as follows:

The compositions of the rubber compound were compounded by means of twin roll or an internal mixer according to the manner described in "Rubber Testing Methods" (Nippon Gomu Kyoukai-Japan Rubber Association) 108–118.

The film was laminated during the production of the stopper 1.

Figure 3:
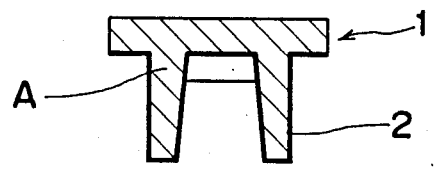
FIG. 3 is a cross section of another embodiment of the laminated rubber stopper of the invention in which the leg portion and the under surface of the head portion are laminated.

In cavities of a bottom mold (number of cavities for the stopper, 225), the resin film was placed followed by unvulcanized rubber compound (Part $A_1$ in FIG. 2 and Part A in FIG. 3). Then, a top mold (a flat mold in FIG. 2 and a mold having cavities corresponding to heads of the stoppers in FIG. 3) was placed so as to pressurize the rubber compound at $150\pm1°$ C. for a predetermined period of time to simultaneously carry out vulcanization of the rubber material of the stoppers and laminating of the resin film on the leg portion 2 of the stopper. Thereafter, the molded rubber was cut to form an individual stopper.

In case of the stopper of FIG. 2, the molded leg portions were placed in the cavities of the same bottom mold. Then, unvulcanized rubber compound ($A_2$) was placed on the leg portions and pressurized by the top mold having cavities corresponding to heads of the stoppers at $150\pm1°$ C. for a predetermined period of time. Thereafter, the molded rubber was cut to form an individual stopper.

Vulcanizing time and failure rates during vulcanization are shown in Table 3, in which films (1) and (2) are those made of the copolymer prepared in Preparation Example and Comparative Preparation Example, respectively.

TABLE 3

| Example No. | Film | Shape of stopper | Vulcanizing time (min.) Leg | Vulcanizing time (min.) Head | Failure rate (%) |
| --- | --- | --- | --- | --- | --- |
| 1 | (1) | FIG. 2 | 6 | 8 | 0.5–1 |
| 2 | (1) | FIG. 3 | 10 | — | 2–3 |
| Comp. 1 | — | FIG. 4 | 6 | 8 | — |
| Comp. 2 | (2) | FIG. 2 | 6 | 8 | 9–11 |
| Comp. 3 | (2) | FIG. 3 | 10 | — | 15–18 |

As is seen from the results in Table 3, the failure rates in Examples are smaller than those in Comparative Examples since the copolymer according to the present invention has larger tensile strength and elongation at break at the vulcanizing temperature than the comparative copolymer.

Hygienic Test

Hygienic test was carried out according to Japanese Pharmacopoeia and "Method of Testing Rubber Stopper for Infusion" to find that the laminated rubber stopper of the present invention satisfied the standards for transmission of extract at $121\pm1°$ C. for 60 minutes, foaming, pH change, zinc, potassium permanganate reducing material and evaporation residue.

In addition, the laminated rubber stopper of the invention passed the tests on injection needle piercing and rubber drop in water according British Standards 3262 (1960).

The number of 10 micrometer fine particles described in Japanese Pharmacopoeia 17 "Injection" was counted by means of a light shaded type automatic fine particle counter (manufactured by HIAC, USA), but no particle was found.

Transmission of Humidity

In a bottle for an injection (JIS R 3523-1978) $TB_3$ with opening diameter of $12.5\pm0.1$ mm, powdery dry calcium chloride ($1\pm0.05$ g) was filled. The opening was sealed with the laminated rubber stopper and rolled with an aluminum cap. The sample bottle was placed in a tester kept at a temperature of $20\pm1°$ C. and relative humidity of 95% ($Na_2HPO_4 \cdot 12H_2O$) for 7, 21, 35 or 70 days and weighed. Transmission (%) was calculated according to the following equation:

$$\text{Transmission (\%)} = \frac{\text{Increased weight} - \text{Standard weight}}{\text{Standard weight}} \times 100$$

wherein standard weight is that weighed after keeping the bottle in phosphorus pentoxide for 4 hours. The results are shown in Table 4.

TABLE 4

Figure 4:
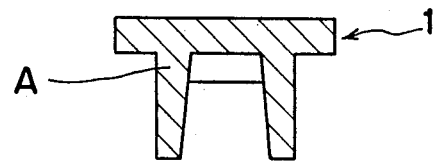
FIG. 4 is a cross section of a non-laminated rubber stopper.

| Example No. | Film | Shape of stopper | Transmission (%) 7 days | 21 days | 35 days | 70 days |
| --- | --- | --- | --- | --- | --- | --- |
| 1 | (1) | FIG. 2 | 0 | 0.1 | 0.2 | 0.4 |
| 2 | (1) | FIG. 3 | 0.1 | 0.3 | 0.6 | 1.0 |
| Comp. 1 | — | FIG. 4 | 0.1 | 0.2 | 0.3 | 0.5 |
| Comp. 2 | (2) | FIG. 2 | 0.2 | 0.4 | 0.5 | 0.7 |
| Comp. 3 | (3) | FIG. 3 | 0.3 | 1.0 | 1.6 | 2.5 |

The stopper laminated with the film of the copolymer produced in Example 1 has better fitting with the bottle opening than the non-laminated rubber stopper, while the stopper laminated with the film of the copolymer produced in Comparative Example 2 has poor fitting with the bottle opening and calcium chloride absorbs water to increase weight since the film is stiff.

Partially because the stopper of Example 2 is laminated on the lower surface of the head portion and the leg portion, it has slightly poorer fitting and larger transmission of water than that of Example 1 but better fitting than that of Comparative Example 3. This means that the laminated rubber stopper of the present invention has substantially the same fitting as or better fitting than the non-laminated one.

Self Sealability

In a bottle for an injection $TB_3$, 10.0 ml of water was precisely added, sealed with the laminated rubber stopper and rolled with an aluminum cap. Its weight was designated as "A".

A hypodermic needle (22 G, 1¼) was attached to a syringe and pierced through the rubber stopper, and 2.0 ml of air was injected in the bottle. With holding the bottle upside down, 2.0 ml of water was extracted followed by pulling out the needle. The weight of the bottle at this stage was designated as "B". The leak amount of water was defined by following equation:

$$\text{Leak amount (mg)} = A - (B + 2.0)$$

The results are shown in Table 5 as an average of 20 bottles.

Vacuum Retention

A bottle for an injection TB$_3$ was sealed with the laminated rubber stopper by means of a vacuum vial stopper which interior was kept at reduced pressure of 20±1 Torr and quickly rolled with an aluminum cap. The bottle was kept at 20±1° C. for 28, 84 or 168 days and degree of vacuum in the bottle was measured by a electronic manometer (manufactured by Toyoda Koki Kabushikikaisha). The difference of degree of vacuum in Torr was shown in Table 5.

Needle Piercing Test (Penetration Force)

A bottle for an injection TB$_3$ was sealed with the laminated rubber stopper and then rolled with an aluminum cap. Penetration force during piercing the stopper with a hypodermic needle (21 G, R.B manufactured by TOP, Japan) was measured by means of an autograph DCS-100 (manufactured by Shimadzu Seisakusho, Japan) at a rate of 200 mm/min. The results are shown in Table 5.

TABLE 5

| Example No. | Film | Shape of stopper | Self sealability (mg) | Vacuum retention (Torr) 28 d | 84 d | 168 d | Penetration force (g) |
|---|---|---|---|---|---|---|---|
| 1 | (1) | FIG. 2 | 0 | 0 | 2 | 5 | 210 |
| 2 | (2) | FIG. 3 | 0.1 | 3 | 11 | 23 | — |
| Comp. 1 | — | FIG. 4 | 0 | 0 | 3 | 6 | 187 |
| Comp. 2 | (2) | FIG. 2 | 0.4 | 11 | 13 | 17 | 357 |
| Comp. 3 | (2) | FIG. 3 | 0.5 | 30 | 98 | 184 | — |

The laminated rubber stopper of Example 1 has better self sealability, vacuum retention and penetration force than the conventional laminated rubber stopper.

In connection with vacuum retention, although the rubber material itself has good properties as the stopper, the conventional laminating resin films have poor flexural modulus or fitting. However, the film used according to the present invention has substantially the same as or better than the rubber material as the stopper.

All the laminated stoppers have small penetration force. While the stopper having such small penetration force generally has poor self sealability, the laminated rubber stopper of the present invention has good self sealability.

As is clear from the above description, the laminated rubber stopper of the present invention has following advantages:

1. Since the laminating film has good flexibility, the laminated stopper has better fitting with the bottle opening and thus good sealability.

2. The laminated rubber stopper of the present invention has good self sealability.

3. The laminated rubber stopper of the present invention has low penetration force of needle.

4. Since the copolymer film used according to the present invention has good physical properties such as tensile strength and elongation at a high temperature, it can be laminated on the rubber stopper simultaneously with vulcanization of the rubber material even if the shape of the stopper is very complicated, so that the productivity of the laminated rubber stopper is substantially the same as that of the non-laminated rubber stopper.

5. The laminated rubber stopper of the present invention is chemically inactive and non-adsorbing so that it may pass the standards as set force in Japanese Pharmacopoeia and British Standards 3263.

What is claimed is:

1. A laminated rubber stopper comprising a head portion and a leg portion which is to be inserted in an opening of an vessel, wherein at least a leg portion is laminated with a film of a copolymer of tetrafluoroethylene, ethylene and at least one fluorine-containing vinyl monomer copolymerizable with tetrafluoroethylene and ethylene, a molar ratio of tetrafluoroethylene and ethylene being from 62:38 to 90:10 and the amount of the fluorine-containing vinyl monomer being from 0.1 to 10% by mole based on the total number of mole of tetrafluoroethylene and ethylene.

2. A laminated rubber stopper according to claim 1, wherein the thickness of the laminated copolymer film is from 0.002 to 0.5 mm.

3. A laminated rubber stopper according to claim 1, wherein the copolymer contains tetrafluoroethylene and ethylene in a molar ratio of 63:37 to 80:20.

4. A laminated rubber stopper according to claim 1, wherein the copolymer contains the fluorine-containing monomer in an amount of 0.5 to 5% by mole based on the total amount of tetrafluoroethylene and ethylene.

* * * * *